United States Patent [19]
Gratton

[11] Patent Number: 5,105,607
[45] Date of Patent: Apr. 21, 1992

[54] METHOD AND MEANS FOR WRAPPING BALES OF HAY

[76] Inventor: Robert E. Gratton, 119 N. Water St., West Newton, Pa. 15089

[21] Appl. No.: 647,459

[22] Filed: Jan. 28, 1991

[51] Int. Cl.$^5$ .......................................... B65B 11/04
[52] U.S. Cl. ...................................... 53/587; 53/118; 53/211
[58] Field of Search ................. 53/118, 441, 211, 556, 53/587, 588, 141

[56] References Cited

U.S. PATENT DOCUMENTS

| | | | |
|---|---|---|---|
| 4,077,179 | 3/1978 | Lancaster | 53/556 X |
| 4,216,690 | 8/1980 | Kaufman | 53/556 |
| 4,563,863 | 1/1986 | Humphrey | 53/556 |
| 4,619,102 | 10/1986 | Geisinger | 53/556 X |
| 4,685,270 | 8/1987 | Brambilla | 53/211 |
| 4,972,656 | 11/1990 | Haugstad | 53/556 X |

FOREIGN PATENT DOCUMENTS

| | | | |
|---|---|---|---|
| 2159489 | 12/1985 | United Kingdom | 53/211 |
| 2200090 | 7/1988 | United Kingdom | 53/556 |

Primary Examiner—John Sipos
Attorney, Agent, or Firm—Zarley, McKee, Thomte, Voorhees & Sease

[57] ABSTRACT

A wrap holder having closable jaws is positioned on a rotatable bale platform beneath a wrap dispenser on a stationary support frame. Rotation of the platform and/or bale will cause the bale to be wrapped. Upon completion of the wrapping the platform is raised allowing the wrap holder to reengage the wrap between the bale and the wrap dispenser. Continued tilting of the platform causes the bale to roll off onto the ground severing the wrap while leaving it attached to the wrap holder. The platform is lowered and is now ready for receiving another bale and the wrapping process is repeated without the operator leaving the prime mover.

4 Claims, 7 Drawing Sheets

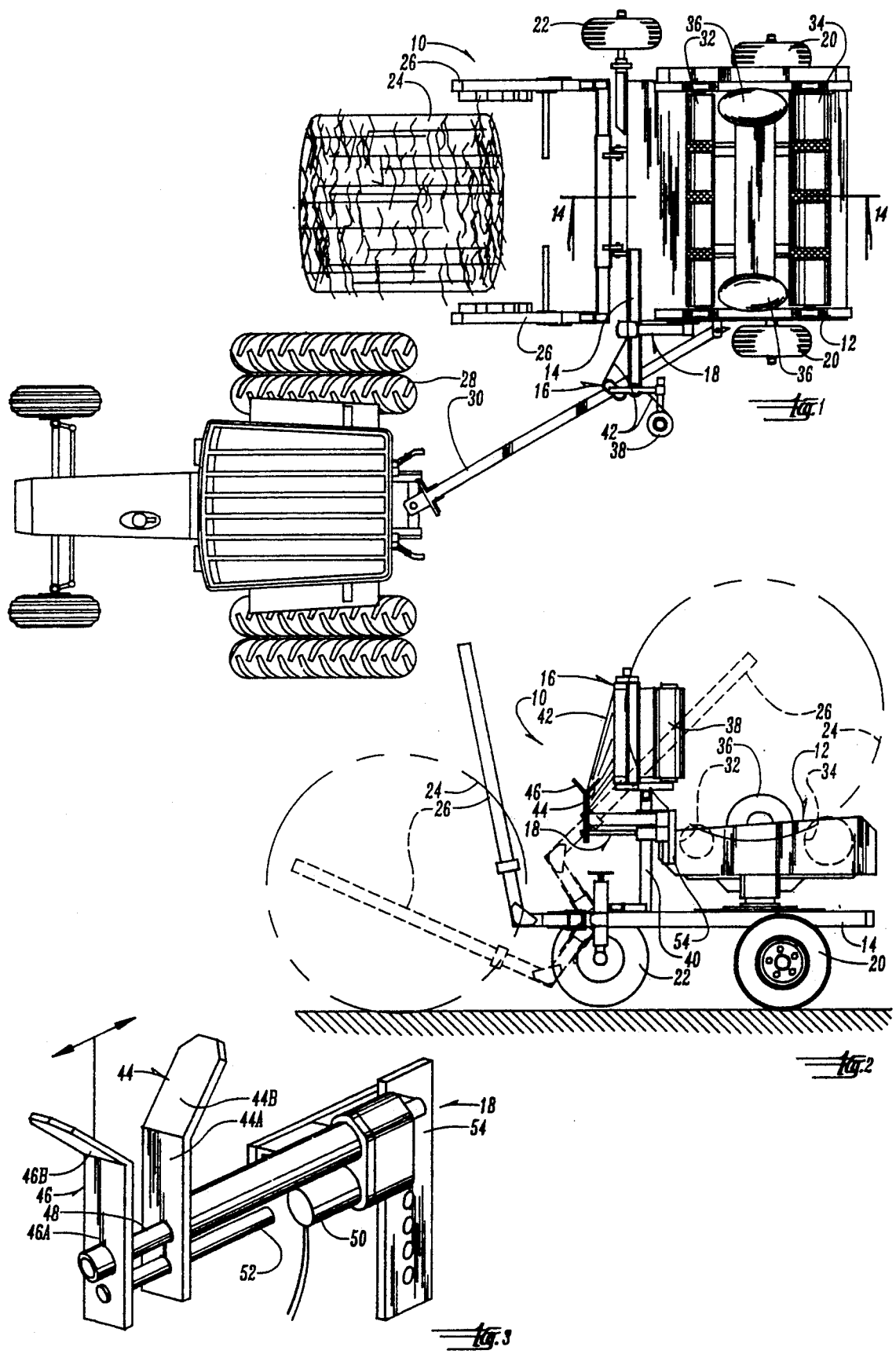

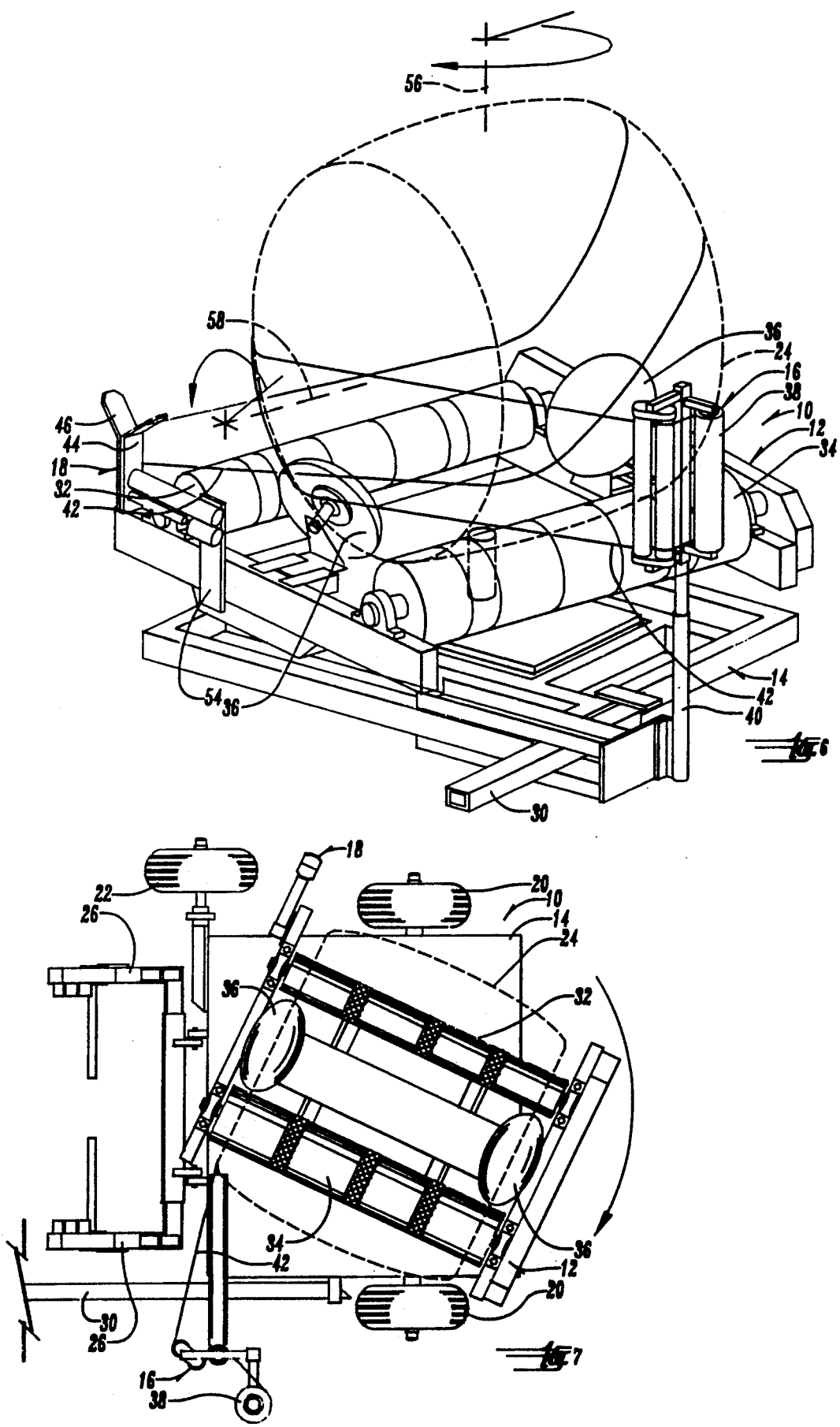

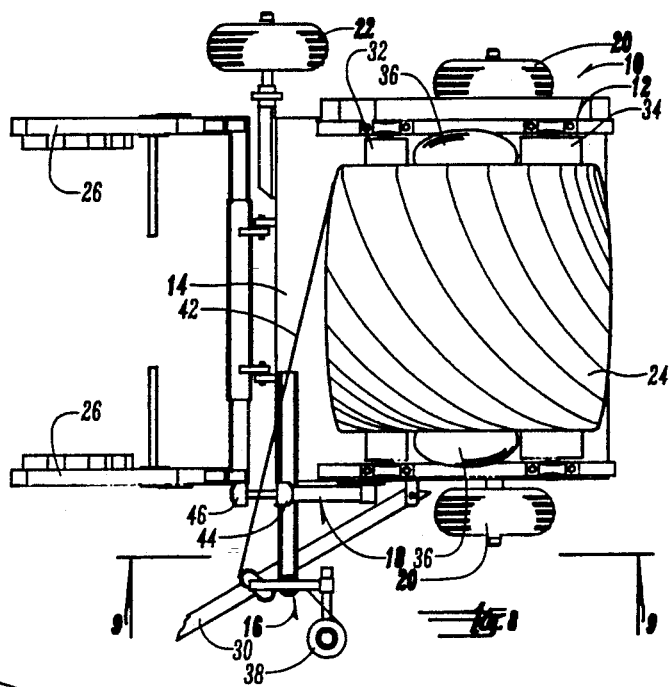
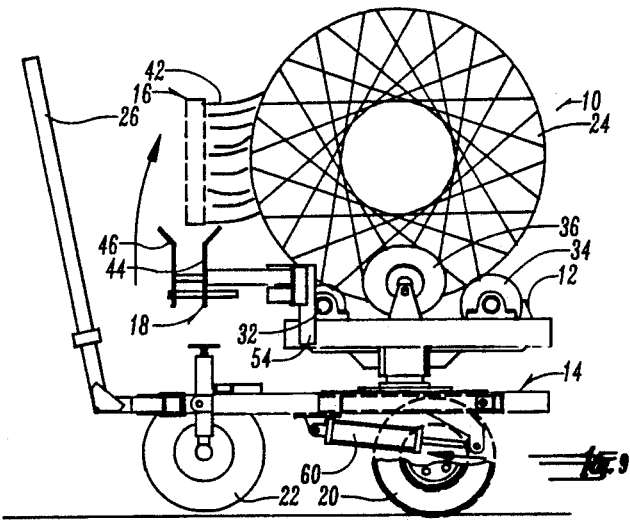
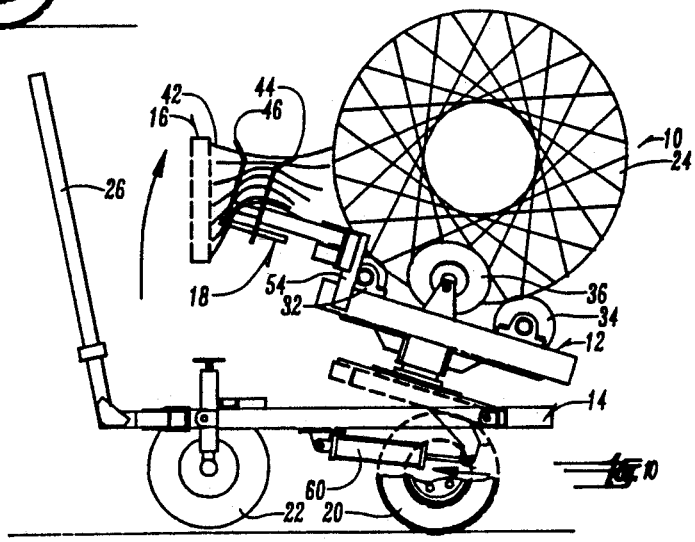

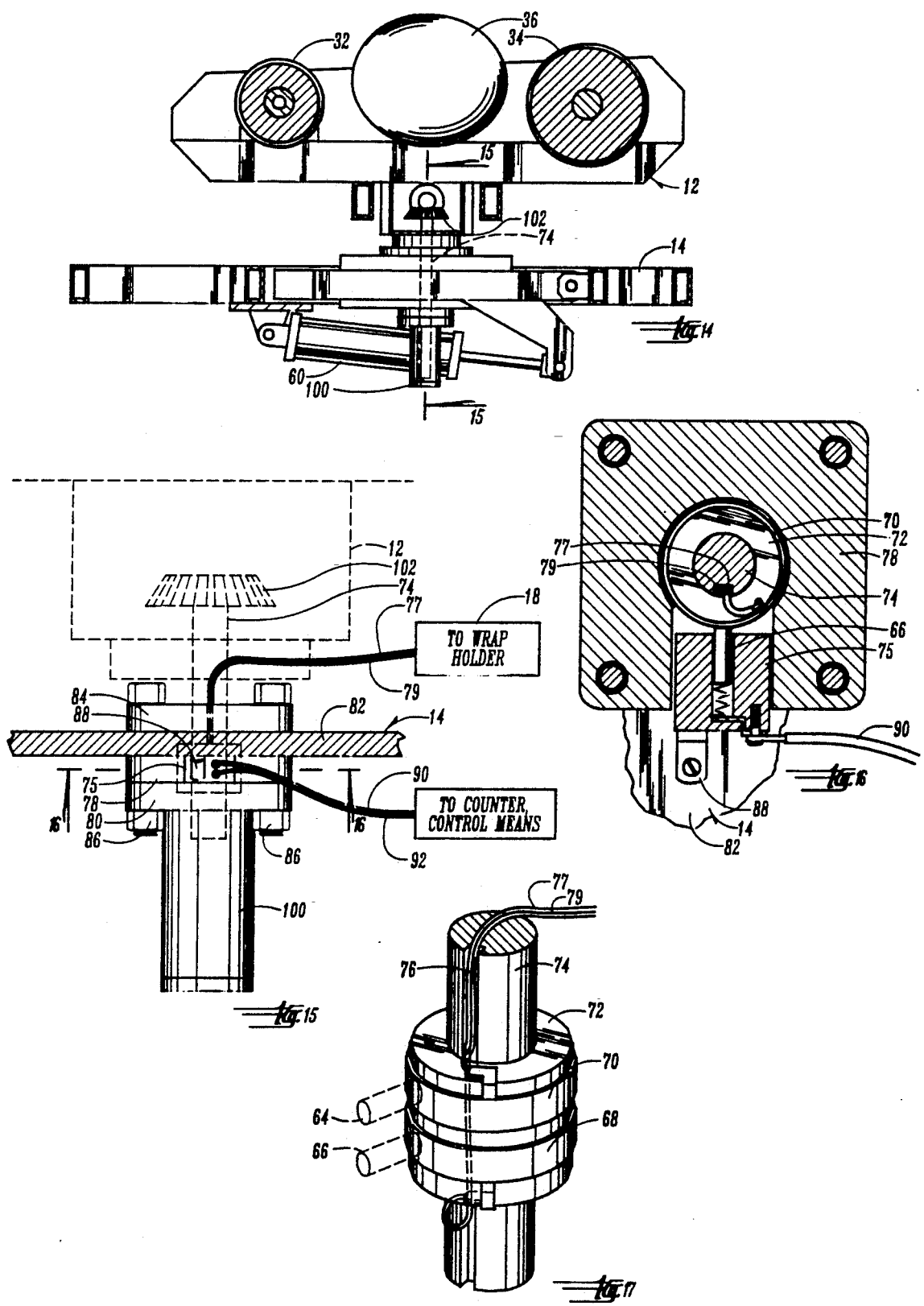

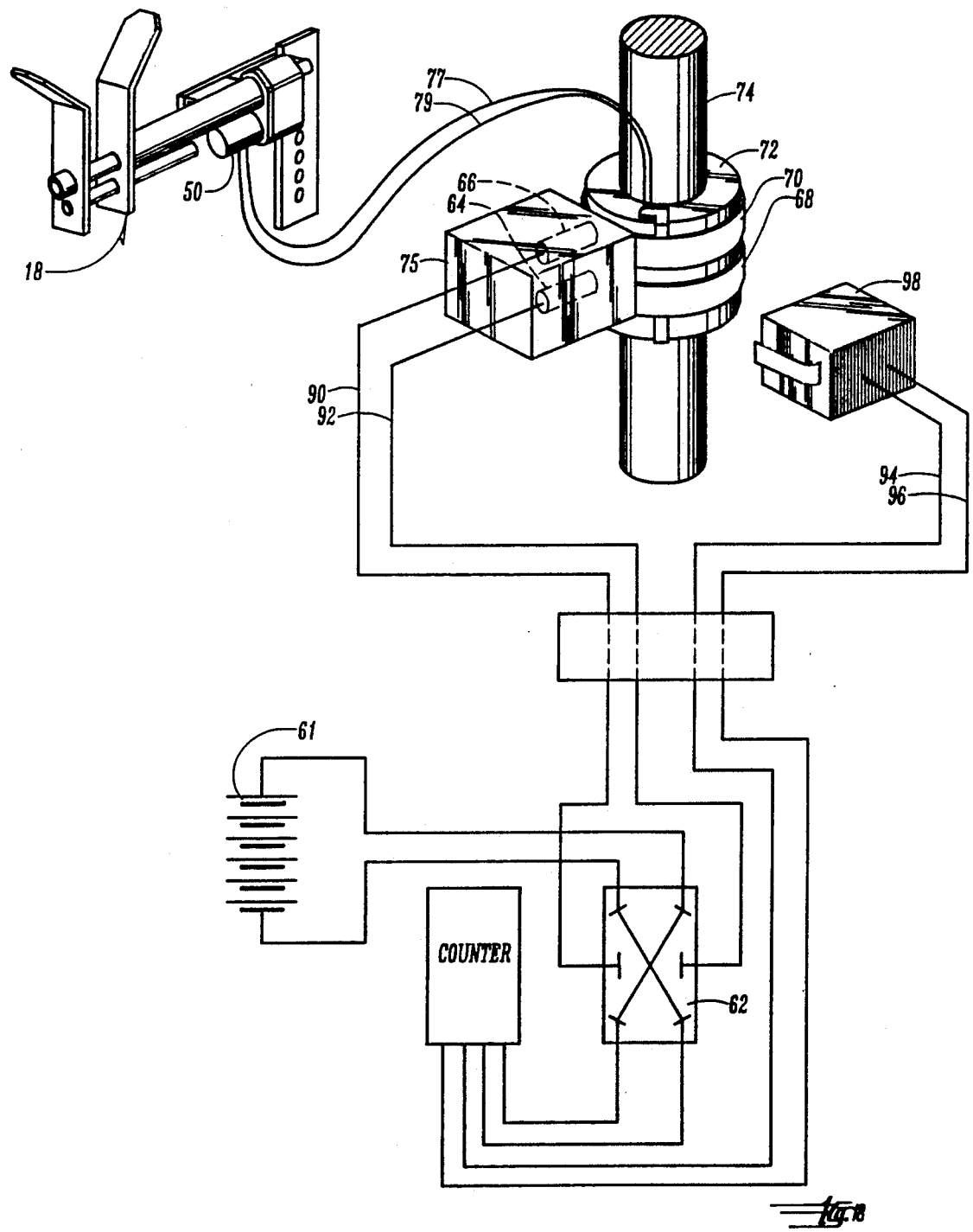

METHOD AND MEANS FOR WRAPPING BALES OF HAY

BACKGROUND OF THE INVENTION

I have disclosed in my co-pending application Ser. No. 07/587,959 filed Sept. 25, 1990, a machine and method for wrapping bales of hay. This machine requires to start the wrapping process manually connecting the free end of the wrap to the bale each time a bale is wrapped. On completion of the wrapping, the wrap must be cut manually.

It is an object of this invention to make the cutting of the wrap prior to unloading and starting the new wrap around the next bale substantially automatic eliminating previously required manual steps by the operator.

SUMMARY OF THE INVENTION

A wrap holder having a pair of jaws is positioned on the rotatable bale platform under a wrap dispenser on the stationary support frame. Rotation of the platform carrying the wrap holder will cause the bale to be wrapped. Upon completion of the wrapping, the platform is tilted raising the wrap holder jaws into engagement with the wrap extending between the wrap dispenser and the bale. Further tilting of the platform causes the bale to roll off onto the ground severing the wrap between the wrap holder and the bale. Lowering of the platform makes the machine ready for wrapping the next bale. Once the wrapping has started, the free end will be pulled from the wrap holder as the bale rotates about both vertical and horizontal axes.

The wrap holder jaws are operated by a motor powered through an electrical circuit extending along the rotational shaft of the platform.

DESCRIPTION OF THE DRAWINGS

FIG. 1 is a top plan view of the bale wrapping machine of this invention.

FIG. 2 is a side elevational view thereof showing a bale being loaded onto the platform.

FIG. 3 is a perspective view of the wrap holder with the jaws in an open position.

FIG. 6 is a view similar to FIG. 4 showing the bale having been rotated and partially wrapped.

FIG. 7 is a top plan view of the bale wrapping machine of FIG. 6 showing the bale partially wrapped.

FIG. 8 is a top plan view showing the wrapping of the bale completed and the wrap holder positioned under the wrap prior to engagement therewith.

FIG. 9 is a side elevational view taken along line 9—9 in FIG. 8.

FIG. 10 is a view similar to FIG. 9 but showing the table tilted thereby raising the wrap holder into engagement with the wrap between the wrap dispenser and the bale.

FIG. 14 is a cross sectional view taken along line 14—14 in FIG. 1.

FIG. 15 is a cross sectional view taken along line 15—15 in FIG. 14.

FIG. 16 is a cross sectional view taken along line 16—16 in FIG. 15.

FIG. 17 is an enlarged fragmentary perspective view of the center shaft and the insulator sleeve including the contact rings.

FIG. 18 is an electrical schematic for the wrap holder motor circuitry.

DESCRIPTION OF PREFERRED EMBODIMENT

Figure 4:
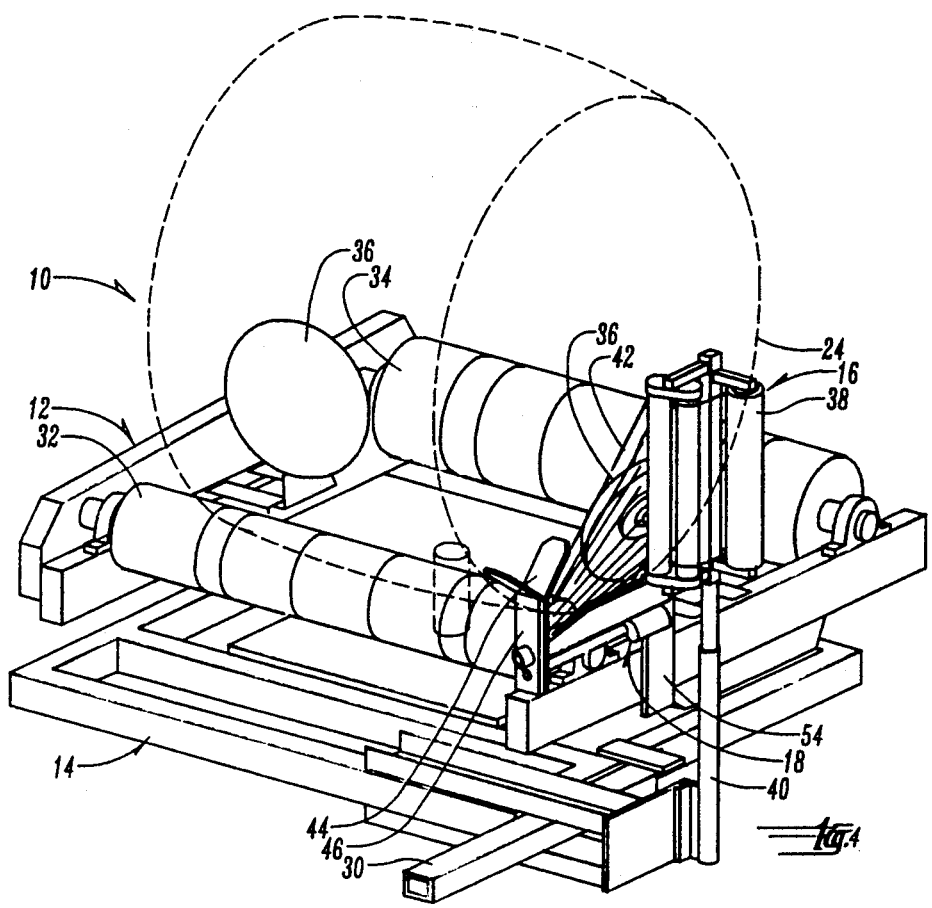
FIG. 4 is a fragmentary perspective view of the bale platform supporting a bale of hay ready to be wrapped.

The bale wrapping machine of this invention is referred to in FIG. 1 generally by the reference numeral 10 and is seen to include a rotatable platform 12 mounted on a support frame 14. A wrap dispenser 16 is on the support frame 14 while a wrap holder 18 is on the platform 12.

The support frame 14 has transport wheels 20 and a front vertically adjustable stabilizer or balancing wheel 22 which is used when bales 24 are loaded over the front end of the platform as seen in FIG. 2 by the front end mounted lift arms 26. A tractor 28 is connected by a tongue 30 to the support frame 14. The platform 12 includes front and rear powered rollers 32 and 34, respectively, and oppositely disposed discs 36 for positioning the bale on the platform 12.

The wrap dispenser 16 and the wrap holder 18 and their operation will now be discussed in greater detail. A roll of wrap 38 is mounted on a post 40 secured to the frame 14 as seen in FIG. 4. The wrap web 42 extends from the roll 38 downwardly into engagement by the wrap holder 18. The wrap holder 18 includes a pair of jaws 44 and 46. The jaw 46 is mounted on a shaft 48 movable between open and closed positions by operation of a motor 50 geared to the shaft 48. A guide rod 52 extends from the jaw 46 through the jaw 44. The jaws 44 and 46 have lower vertical portions 44A and 46A which flare upwardly and outwardly into portions 44B and 46B. A mounting bracket 54 connects the wrap holder 18 to the platform 12 at a forward corner below the dispenser 16 when the platform is in its horizontal lowered position of FIG. 4.

Figure 5:
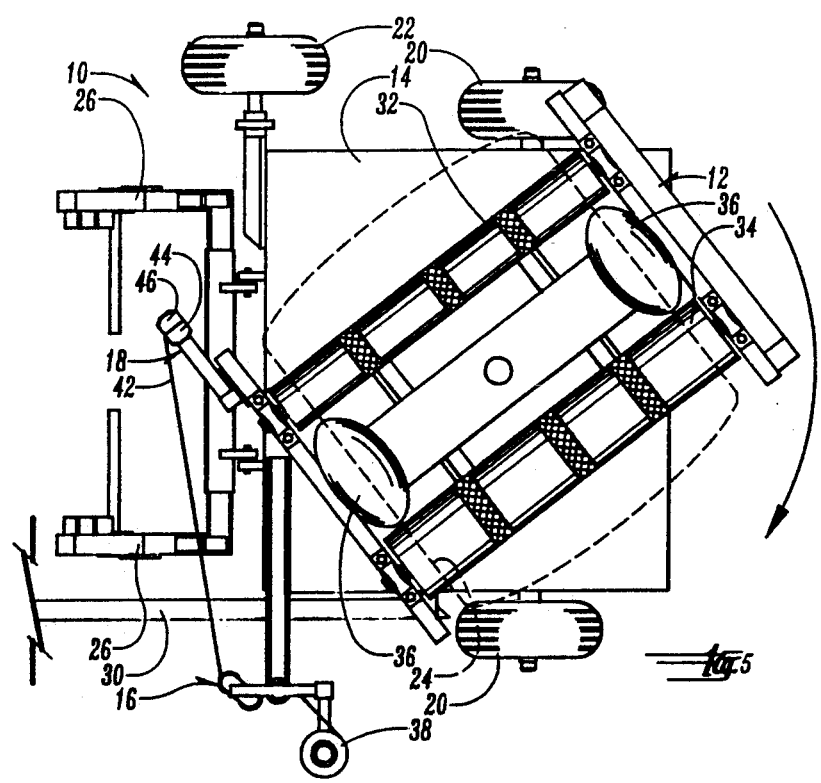
FIG. 5 is a top plan view showing the start of the wrapping process wherein the bale platform has started to rotate.
Figure 11:
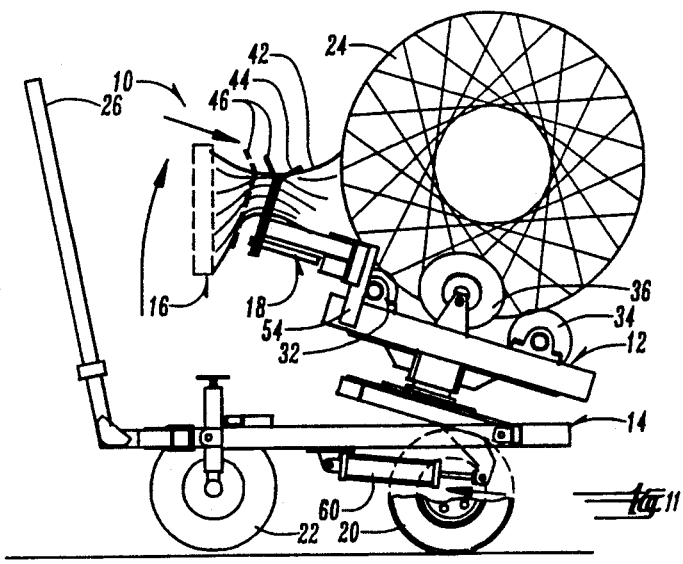
FIG. 11 is a view similar to FIG. 10 showing the jaws of the wrap holder having been closed onto the wrap.
Figure 12:
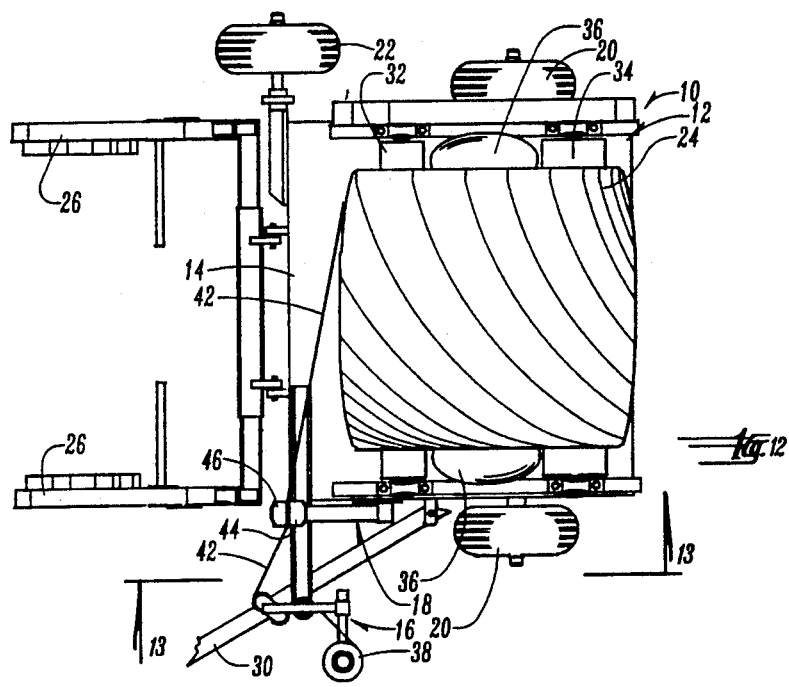
FIG. 12 is a top plan view of the bale machine of FIG. 11.
Figure 13:
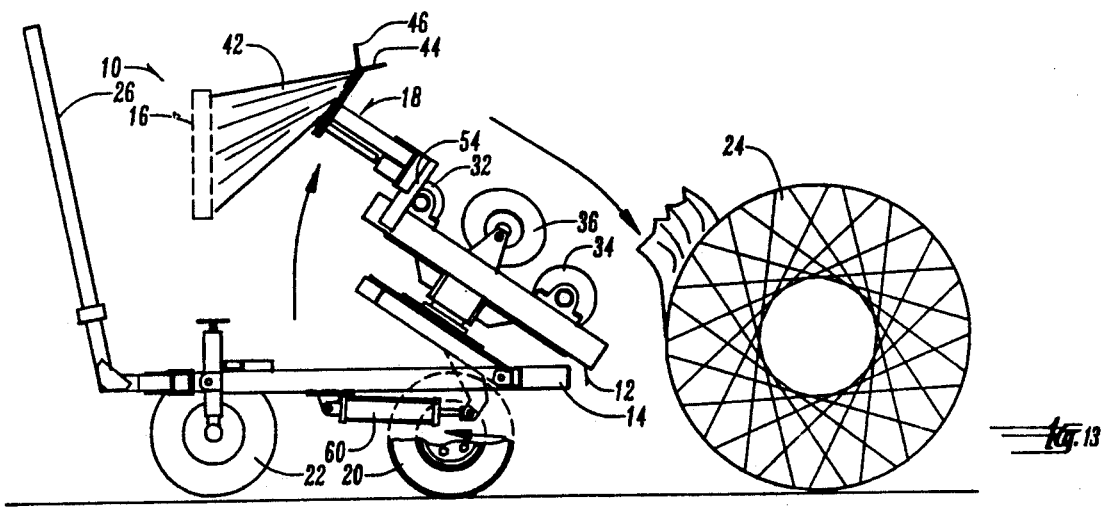
FIG. 13 is a side elevational view taken along line 13—13 in FIG. 12 and showing the platform being tilted further such that the bale has rolled off onto the ground and the wrap has been severed from the wrap holder preparatory to the next bale being wrapped.

In operation it is thus seen that the wrap is initially manually extended and connected between the jaws 44 and 46 of the wrap holder 18 as seen in FIG. 4. The platform is then rotated as seen in FIG. 5 causing the wrap material to encase the bale 24 as seen in FIG. 6. The bale is rotated by the platform 12 about a vertical axis 56 and a horizontal axis 58 by the rotation of the rollers 32 and 34. Continued rotation of the bale disconnects the wrap webbing 42 from the wrap holder 18 or the jaws may be opened by operation of the motor 50. Upon completion of the wrapping of the bale the platform 12 is rotated to its normal position shown in FIG. 8 with the jaws 44 and 46 in their open position below the wrap web 42. Next the table 12 is tilted rearwardly by operation of a hydraulic cylinder 60 which in turn raises the wrap holder 18 into engagement with the wrap web 42 as seen in FIG. 10. The jaws are then closed onto the wrap web 42 as seen in FIG. 11 and the platform is then tilted further rearwardly as seen in FIG. 13 allowing the bale 24 to roll off of the platform onto the ground and severing the wrap web 42 between the wrap holder 18 and the bale 24. The wrap web 42, however, still extends between the wrap holder 18 and the wrap dispenser 16. The table is now returned to its lowered position of FIGS. 1 and 2 and the wrapping process is repeated. It is thus seen that the operator on the tractor 28 after he initially connects the wrap web 42 to the holder 18 does not have to leave the tractor again during the wrapping of successive bales of hay.

The motor 50 for operating the wrap holder 18 is powered by a battery 61 through a reversing switch 62 in turn connected to a pair of brushes 64 and 66 in contact with contact rings 68 and 70 mounted on an insulator sleeve 72 keyed to the center shaft 74. Electrical wires 77 and 79 extend from the contact rings 68 and 70 within a longitudinal slot 76 within the center shaft 74 and are routed to the motor 50.

The brushes 64 and 66 are mounted in a brush holder 75 contained within a mounting plate 78 sandwiched between a bottom bearing seal 80 and a frame plate 82 on which a top bearing seal 84 is mounted all of which are held together by bolts 86. The brush holder 75 is connected to the frame plate 82 by a bracket 88. A pair of wires 90 and 92 connect the brushes 64 and 66 to the reversing switch 62 and a pair of wires 94 and 96 are connected to a counter 98 in engagement with the rotatable platform 12 for counting platform revolutions. The center shaft 74 is connected to a hydraulic motor 100 at its lower end and also is mounted on the bottom bearing seal 80. A gearing arrangement 102 which is not a part of this invention connects the center shaft to the rollers 32 and 34.

Thus it is seen that the electrical contact rings 68 and 70 are sealed from contamination from the top and bottom by the bearing seals 80 and 84. The mounting plate 78 containing the brush holder 75 and in turn the brushes 64 and 66 is totally sealed from environmental contaminants and thus electrical energy is supplied to the wrap holder motor 50 on an uninterrupted basis.

What is claimed is:

1. A hay bale wrapping machine, comprising,
a bale wrapping platform rotatably mounted on a support frame,
a wrap dispenser mounted on said support frame,
a wrap holder on said platform, and
power means for rotating said platform whereby wrap being held by said wrap holder is pulled from said wrap dispenser and wrapped around a bale on said bale wrapping platform, said wrap holder includes a pair of jaws movable between open and closed positions; electrical power means is connected to said pair of jaws for opening and closing the jaws; said platform includes a center shaft rotatably connected to said platform and said rotating power means; a pair of contact rings are mounted on and are rotatable with said center shaft, said center shaft includes a pair of conductor wires received in a longitudinal slot formed in said center shaft and connected to said contact rings and to said wrap holder; and said electrical power means includes electrical wires connected to a pair of stationary brush means in contact with said pair of contact rings.

2. The structure of claim 1 and top and bottom bearing seals are mounted on said support frame with said center shaft rotatably extending therethrough and said pair of contact rings being positioned between said seals.

3. The structure of claim 2 wherein said contact rings are rotatably mounted in a mounting plate connected to said top and bottom bearings; said pair of stationary brush means are mounted in a brush holder contained within said mounting plate.

4. The structure of claim 3 and said contact rings are insulated from said center shaft and each other by being mounted on an insulator sleeve mounted on and rotatable with said center shaft.

* * * * *